Nov. 23, 1971     K. G. DAHLBERG     3,621,532
THERMOFORMER

Filed May 15, 1969     3 Sheets-Sheet 1

INVENTOR.
KURT G DAHLBERG

BY *Jumpston, Shaw and Stephens*

ATTORNEYS

United States Patent Office 3,621,532
Patented Nov. 23, 1971

3,621,532
THERMOFORMER
Kurt G. Dahlberg, Pittsford, N.Y., assignor to
Thermo Trim, Inc., East Rochester, N.Y.
Filed May 15, 1969, Ser. No. 824,978
Int. Cl. B29c 17/00; B30b 1/14
U.S. Cl. 18—19                13 Claims

ABSTRACT OF THE DISCLOSURE

A thermoforming machine for molding products from thermoplastic sheet stock includes a shaft below the sheet stock plane and toggle lever sets each having one toggle lever fixed to the shaft and the other fixed to a movable part. One toggle lever set is connected to the lower mold platen and the other to vertically movable guides that guide the lower mold platen and carry the upper mold platen. The toggles are oppositely oriented and are operated by reciprocally turning the shaft to draw the mold platens together at the sheet plane on one stroke and separate them on the other stroke.

THE IMPROVEMENT EFFECTED

Generally known thermoforming machines use movable platens for opening and closing mold parts relative to a sheet plane for forming foamed plastic sheet stock into trays, dishes, egg cartons, and many other products. Many of such thermoforming machines are pneumatically powered and are complex, expensive, slow, and insufficiently forceful in closing the mold parts. Also, such machines have required lubricated, moving parts above the sheet plane where oil occasionally dripped onto the sheet stock or molded product. This is especially undesirable for products used in the food industry.

The objects of the invention include, without limitation, improving on prior art thermoforming machines and making a simpler, less expensive, faster, and more forceful thermoforming machine that arranges most of its lubricated parts below the sheet stock plane so oil cannot drip onto the sheet stock or the molded product. The invention also aims at a machine that is more economical to build and operate, closes the mold parts more forcefully to produce a better molded product, and is generally more accurate and efficient than previous thermoforming machines.

SUMMARY OF THE INVENTION

The inventive thermoforming machine includes a frame supporting parts for advancing thermoplastic sheet stock along a path for molding products from the stock. Vertical guides are arranged on opposite sides of the sheet stock path and supported for vertical motion relative to the frame. An upper mold-carrying platen is fixed to the guides above the sheet stock path, and a lower mold-carrying platen is mounted for vertical motion on the guides below the sheet stock path. A shaft is arranged on the frame below the sheet stock path, and pairs of connected toggle levers are arranged with one lever of each pair fixed to the shaft and the other lever of each pair connected respectively to the lower platen and to the guides. The toggle lever sets are oppositely oriented so that they move the lower platen upward on the guides and move the guides and the upper platen downward as the shaft turns in one direction and reverse such motion as the shaft turns in the other direction. This accomplishes opening and closing of the mold parts at the sheet stock plane as the shaft is reciprocated. Preferably the shaft is turned by a driven eccentric, a connecting rod, and a crank on the shaft, and the driven eccentric is timed to the sheet stock advancement by a clutch that selectively connects the eccentric to a driven fly wheel.

DRAWINGS

DETAILED DESCRIPTION

Figures 1, 2:
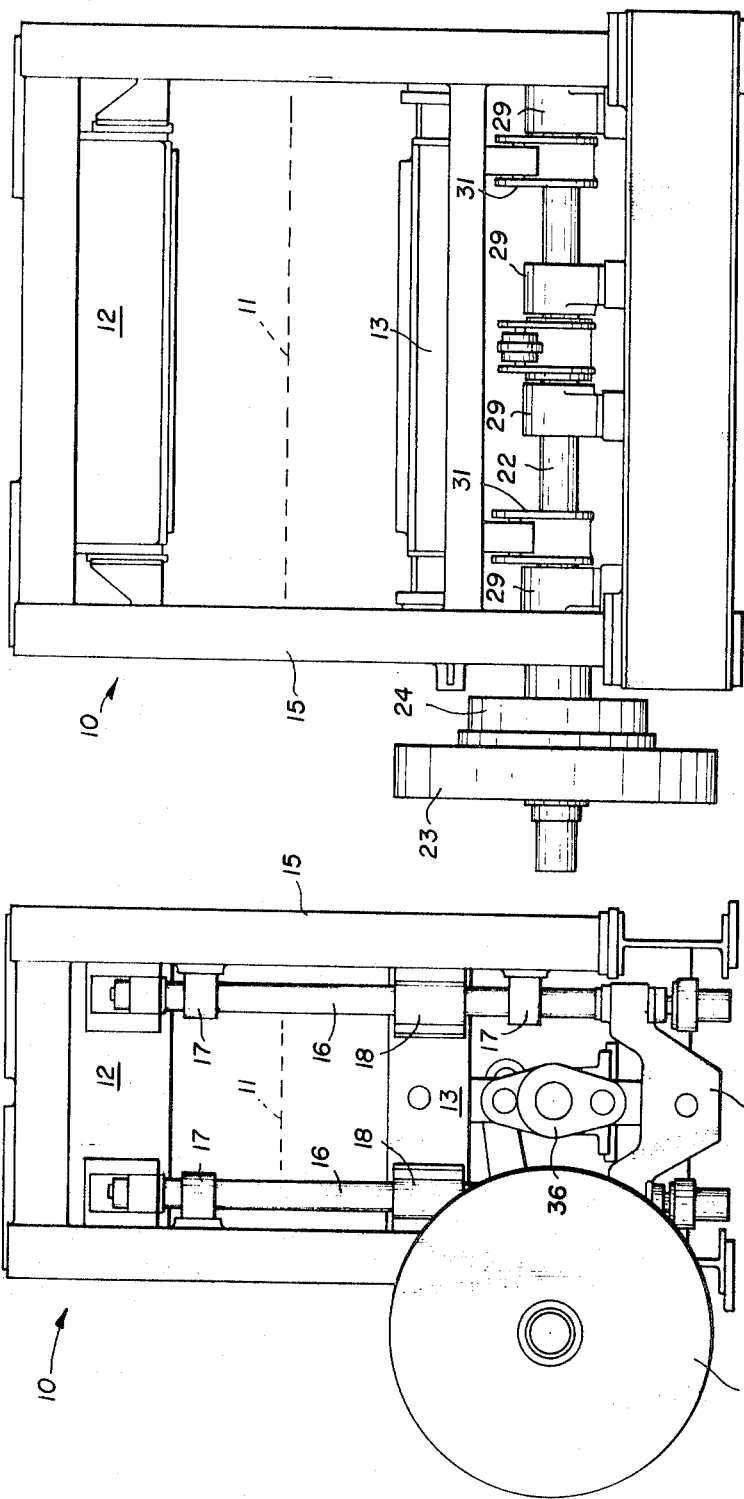
FIG. 1 is a side elevation of a preferred embodiment of the inventive thermoformer.
FIG. 2 is a front elevation of the thermoformer of FIG. 1.
Figure 4:
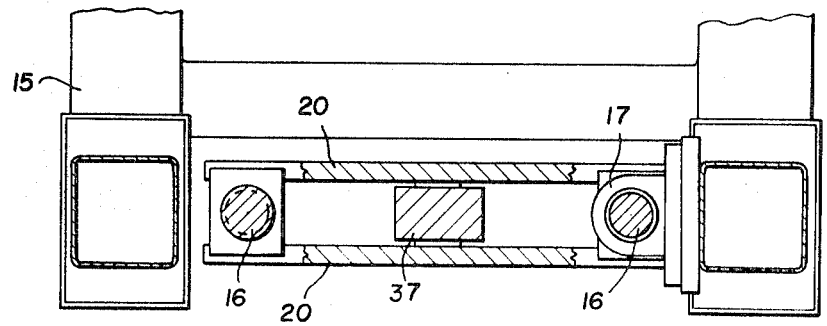
FIG. 4 is a cross section of the thermoformer of FIG. 3 taken along the line 4—4 thereof.
Figure 3:
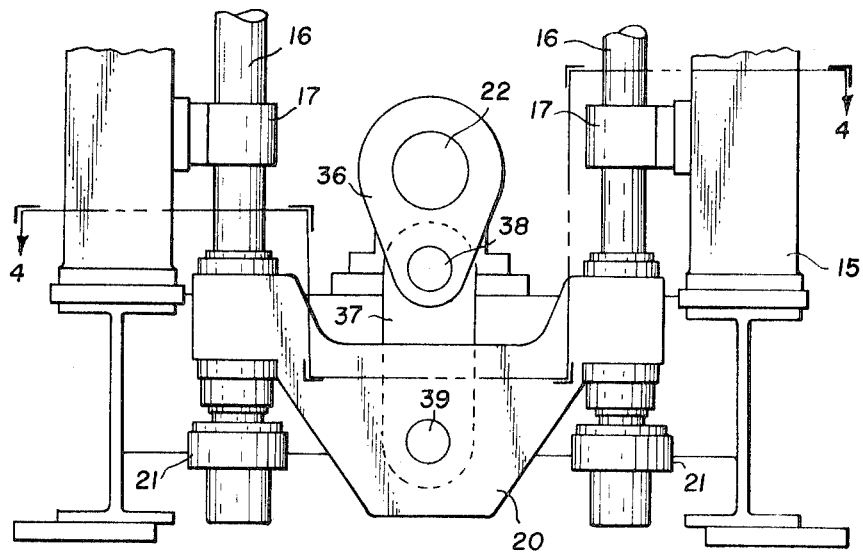
FIG. 3 is a fragment of an end view of the thermoformer of FIG. 1.
Figure 6:
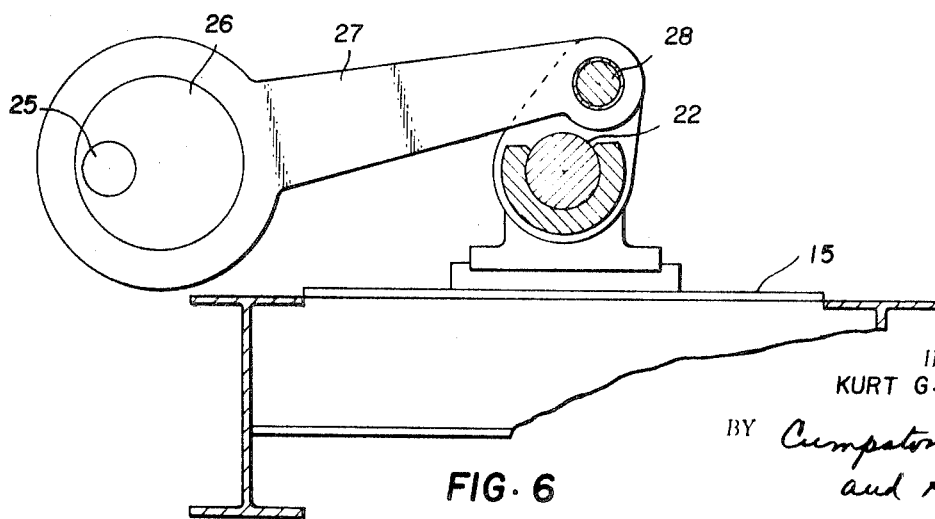
FIG. 6 is a cross-sectional view of the drive shaft of FIG. 5 taken along the line 6—6 thereof.
Figure 5:
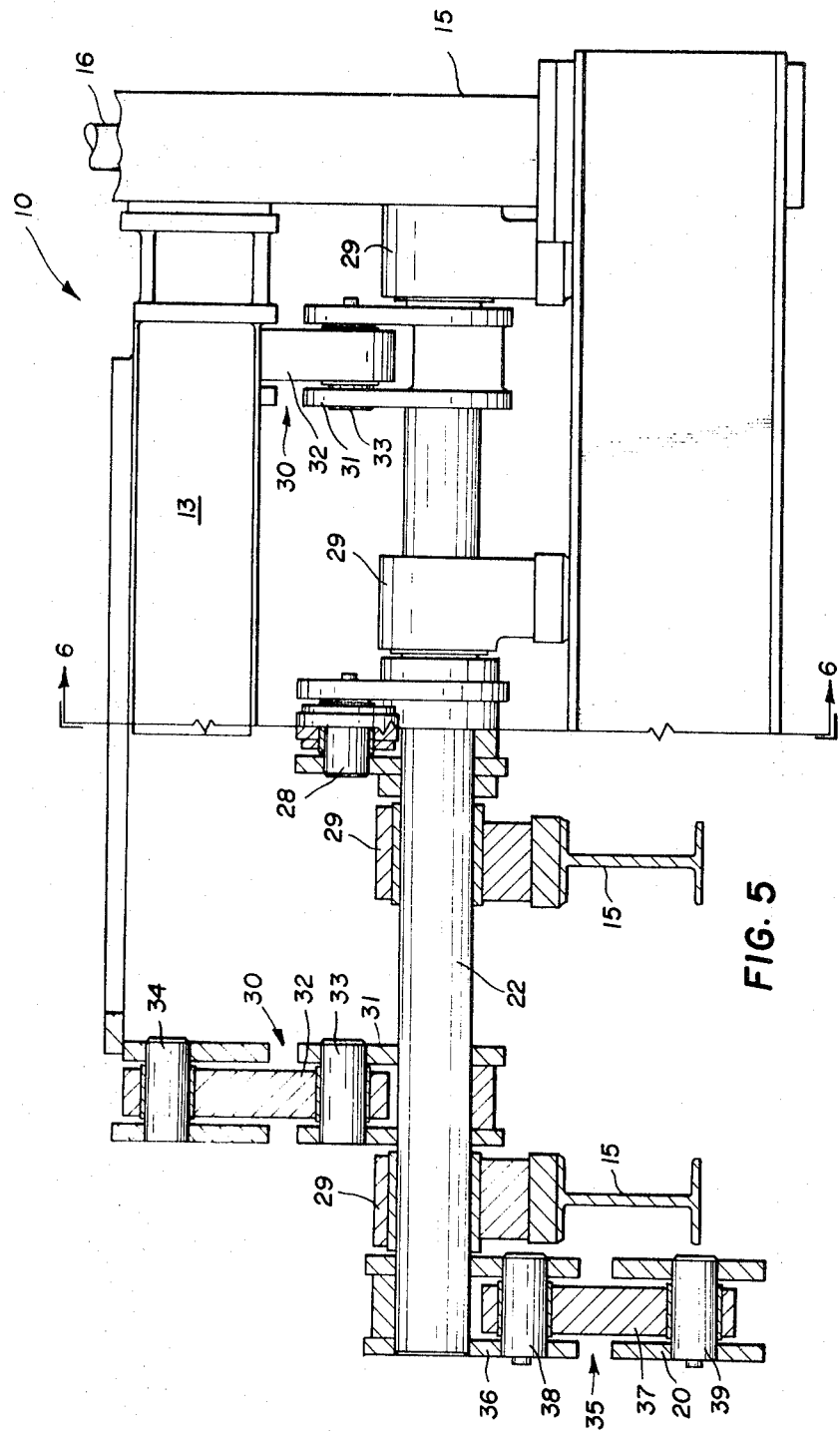
FIG. 5 is a partially sectional elevational view of the drive shaft and toggle lever sets for the thermoformer of FIGS. 1–4.

The drawings show only one preferred embodiment of the inventive thermoforming machine even though the invention has many other applications. Generally known or conventional equipment necessarily associated with the illustrated device has been omitted for the sake of brevity.

Thermoformer 10 has an upper mold platen 12 and a lower mold platen 13, movable vertically relative to sheet stock plane 11 along which heated, thermoplastic sheet stock is fed for forming by molds (not shown) carried by the upper and lower mold platens. Movement of the upper and lower mold platens 12 and 13 toward and away from sheet stock plane or path 11 is synchronized with the advance of sheet stock and other machine operations in a generally known way.

A frame 15, including a number of frame members, supports the elements of thermoformer 10. Four vertical guides 16 are supported by bearings 17 for vertical motion relative to frame 15. The upper ends of guides 16 are fastened securely to upper platen 12, so that upper platen 12 is carried vertically by guides 16. Lower platen 13 carries bearings 18 that encircle guides 16 for guiding lower platen 13 in vertical motion relative to guides 16. Hence, lower platen 13 is freely movable vertically on guides 16, and guides 16 in turn are freely movable vertically in bearings 17 for carrying upper platen 12 in its vertical motion.

A pair of guides 16 are arranged at each side of machine 10 on opposite sides of the path 11 for the sheet stock. A pair of yokes 20 respectively connect the guide pairs at each side of machine 10. Yokes 20 are securely fastened to guide rods 16 above collars 21 arranged at the lower ends of guides 16.

A drive shaft 22 is arranged transversely of machine 10 and sheet stock path 11, and below path 11. Drive shaft 22 is rotated reciprocally on its axis in synchronization with other operations of machine 10 for closing and separating the mold platens. The reciprocating of shaft 22 is accomplished through driven flywheel 23, pneumatic clutch 24, shaft 25, eccentric 26, connecting rod 27, and crank journal 28 on shaft 22. Clutch 24 is selectively operated to engage shaft 25 to fly wheel 23 for rotation of eccentric 26 to drive connecting rod 27 and crank 28 in successive reciprocal motions that turn shaft 22 in reciprocating rotation of preferably about 30°. The axial position of shaft 22 is securely fixed relative to frame 15 by bearings 29 supporting shaft 22.

A pair of toggle lever sets 30 are connected between shaft 22 and lower mold platen 13. Each of the toggle lever sets 30 includes levers 31 fixed to shaft 22, and levers 32 pivotally connected to levers 31 on pins 33 and pivotally connected to lower platen 13 on pins 34.

Another pair of toggle lever sets 35 are connected between shaft 22 and yokes 20. Toggle lever sets 35 include levers 36 fixed to shaft 22, and levers 37 pivotally connected to levers 36 on pins 38 and pivotally connected to yokes 20 on pins 39. Levers 31 and 36 are radially opposite each other and oriented about 180° apart relative to shaft 22.

When shaft 22 is turned to the position illustrated in the drawings, lower mold platen 13 is driven to its uppermost position under the force and mechanical advantage of toggles 30 and upper mold platen 12 is pulled all the way down by guides 16 and yokes 20 under the force and mechanical advantage of toggles 35. This forcefully closes the mold parts carried by the upper and lower mold platens for rapid and positive molding action. At the other end of the stroke of eccentric 26, connecting rod 27, and crank 28, shaft 22 is turned so that toggle lever sets 30 and 35 are angled for raising yokes 20, guides 16, and upper mold platen 12, and for lowering lower mold platen 13 to separate the mold parts for advancement of the molded product from the machine and advancement of a fresh length of heated sheet stock between the mold platens for a successive mold closure.

The inventive improvement locates drive shaft 22 and toggle lever sets 30 and 35 below sheet stock plane 11 so that any oil dripping from these parts will not fall on the sheet stock or the molded product. Furthermore, the forces applied in closing the mold platens are concentrated in the region below stock path 11 so that the stronger and more massive parts of the machine are kept low to allow lighter construction above stock path 11. The only moving parts above path 11 are guides 16 moving in bearings 17 to carry upper platen 12, and the construction of the upper part of machine 10 need only be strong enough to support guides 16 and platen 12. Lubrication of bearings 17 can be accomplished without any oil dripping onto stock or products, and bearings 17 are the only lubricated parts above path 11. In addition, the inventive arrangement is fast-acting, readily synchronized with other machine operations, sufficiently powerful for accurate and efficient molding, and yet is simple and economical to construct and operate.

Persons wishing to practice the invention should remember that other embodiments and variations can be adapted to particular circumstances. Even though one point of view is necessarily chosen in describing and claiming the invention, this should not inhibit broader or related applications within the spirit of the invention. For example, different bearing and toggle lever arrangements can be used, and guide and yoke arrangements can be varied.

I claim:
1. In thermoforming machine for molding products from thermoplastic sheet stock, and including a frame, and means on said frame for advancing said sheet stock along a path, the improvement comprising:
(a) vertical, parallel guides arranged on opposite sides of said path;
(b) means on said frame for supporting said guides for vertical motion relative to said frame;
(c) an upper, mold-carrying platen fixed to said guides above said path;
(d) a lower, mold-carrying platen mounted for vertical motion on said guides below said path;
(e) a shaft arranged on said frame below said path;
(f) a connected pair of lower platen toggle levers;
(g) one of said lower platen toggle levers being fixed to said shaft;
(h) the other of said lower platen toggle levers being connected to said lower platen;
(i) a connected pair of upper platen toggle levers;
(j) one of said upper platen toggle levers being fixed to said shaft;
(k) the other of said upper platen toggle levers being connected to said guides;
(l) means for reciprocally rotating said shaft on its axis to operate said toggle levers; and
(m) said toggle levers being arranged for moving said lower platen upward on said guides and moving said guides and said upper platen downward as said shaft turns in one direction and for moving said lower platen downward on said guides and moving said guides and said upper platen upward as said shaft turns in the opposite direction.

2. The machine of claim 1 wherein said shaft rotating means comprises a driven eccentric, a crank on said shaft, and a connecting rod joining said eccentric and said crank.

3. The machine of claim 2 including a driven fly wheel and a clutch arranged for selectively engaging said eccentric to said fly wheel.

4. The machine of claim 1 wherein said one lower platen toggle lever and said one upper platen toggle lever are radially opposite each other on said shaft.

5. The machine of claim 1 wherein said guides are cylindrical shafts, and said support means for said guides are bearings surrounding said guides.

6. The machine of claim 1, including a pair of said guides arranged on each side of said path.

7. The machine of claim 6, including a pair of yokes respectively connecting the guides of each of said pairs of guides.

8. The machine of claim 7, including a pair of said upper platen toggle levers connected respectively to each of said yokes.

9. The machine of claim 8, including two pairs of said lower platen toggle levers.

10. The machine of claim 9 wherein said shaft rotating means comprises a driven eccentric, a crank on said shaft, and a connecting rod joining said eccentric and said crank.

11. The machine of claim 10 including a driven fly wheel and a clutch arranged for selectively engaging said eccentric to said fly wheel.

12. The machine of claim 11 wherein said guides are cylindrical shafts and said support means for said guides comprise bearings surrounding said guides.

13. The machine of claim 12 wherein said one lower platen toggle lever and said one upper platen toggle lever are radially opposite each other on said shaft.

References Cited
UNITED STATES PATENTS

| | | | |
|---|---|---|---|
| 2,269,758 | 1/1942 | De Noronha | 18—16 T X |
| 3,103,701 | 9/1963 | Calchera et al. | 18—30 LT X |
| 3,166,790 | 1/1965 | Keyes | 18—16 T X |
| 3,205,551 | 9/1965 | Neubauer et al. | 18—16 T UX |
| 3,268,952 | 8/1966 | Shelby | 18—16 T UX |
| 3,278,989 | 10/1966 | Neubauer et al. | 18—16 T |
| 3,340,574 | 9/1967 | O'Brien et al. | 18—16 T |
| 3,346,923 | 10/1967 | Brown et al. | 18—16 T X |

J. HOWARD FLINT, JR., Primary Examiner

U.S. Cl. X.R.

18—16 T, 30 LT; 25—90